(12) United States Patent
Taylor et al.

(10) Patent No.: US 10,661,175 B2
(45) Date of Patent: May 26, 2020

(54) INTELLIGENT USER-BASED GAME SOUNDTRACK

(71) Applicant: Sony Interactive Entertainment Inc., Tokyo (JP)

(72) Inventors: Michael Taylor, San Mateo, CA (US); Glenn Black, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 61 days.

(21) Appl. No.: 15/715,653

(22) Filed: Sep. 26, 2017

(65) Prior Publication Data

US 2019/0091576 A1 Mar. 28, 2019

(51) Int. Cl.
| | |
|---|---|
| A63F 13/33 | (2014.01) |
| A63F 13/54 | (2014.01) |
| A63F 13/63 | (2014.01) |
| A63F 13/30 | (2014.01) |
| A63F 13/67 | (2014.01) |

(52) U.S. Cl.
CPC .............. *A63F 13/63* (2014.09); *A63F 13/30* (2014.09); *A63F 13/33* (2014.09); *A63F 13/54* (2014.09); *A63F 13/67* (2014.09); *G10H 2210/026* (2013.01); *G10H 2240/131* (2013.01)

(58) Field of Classification Search
CPC .......... A63F 13/63; A63F 13/67; A63F 13/33; A63F 13/54; A63F 13/30; G10H 2210/026; G10H 2240/131
See application file for complete search history.

(56) References Cited

U.S. PATENT DOCUMENTS

| | | |
|---|---|---|
| 5,987,415 A | 11/1999 | Breese et al. |
| 6,324,511 B1 | 11/2001 | Kiraly et al. |
| 6,334,104 B1 | 12/2001 | Hirai |
| 6,728,679 B1 | 4/2004 | Strubbe et al. |
| 6,816,577 B2 | 11/2004 | Logan |
| 6,975,988 B1 | 12/2005 | Roth et al. |
| 7,003,515 B1 | 2/2006 | Glaser et al. |
| 7,644,000 B1 | 1/2010 | Strom |
| 7,663,045 B2 | 2/2010 | Schmidt et al. |
| 8,965,460 B1 * | 2/2015 | Rao .......................... G06F 3/005 455/566 |
| 9,253,560 B2 | 2/2016 | Goldstein et al. |

(Continued)

*Primary Examiner* — James S. McClellan
*Assistant Examiner* — Peter J Iannuzzi
(74) *Attorney, Agent, or Firm* — Carr & Ferrell LLP

(57) ABSTRACT

A method, system, and processor-readable storage medium for providing audio playback are disclosed to enable users to replace background music in a computer or video game with music of user choice, while preserving other in-game sounds. An example method comprises receiving a game music stream from a gaming application of a user which includes a game background soundtrack and in-game sounds, extracting audio parameters of the game background soundtrack, determining an emotional classification of the game background soundtrack based on the audio parameters of the game background soundtrack, selecting a user soundtrack from a user music library that matches the emotional classification of game background soundtrack, replacing at least a part of the game background soundtrack with the user soundtrack, and providing a replacement game music stream to the user, the replacement game music including the user soundtrack and the in-game sounds.

23 Claims, 3 Drawing Sheets

(56) References Cited

U.S. PATENT DOCUMENTS

| | | |
|---|---|---|
| 9,563,268 B2 | 2/2017 | Smith et al. |
| 10,242,674 B2 | 3/2019 | Black |
| 2001/0035087 A1 | 11/2001 | Subotnick |
| 2002/0191757 A1 | 12/2002 | Belrose |
| 2003/0227473 A1 | 12/2003 | Shih et al. |
| 2004/0005923 A1 | 1/2004 | Allard et al. |
| 2004/0193420 A1 | 9/2004 | Kennewick et al. |
| 2005/0033657 A1 | 2/2005 | Herrington et al. |
| 2005/0045025 A1 | 3/2005 | Wells et al. |
| 2005/0051021 A1 | 3/2005 | Laakso |
| 2006/0143236 A1* | 6/2006 | Wu .................. G11B 27/034 |
| 2006/0212444 A1 | 9/2006 | Handman et al. |
| 2007/0021145 A1 | 1/2007 | Lam |
| 2007/0068367 A1 | 3/2007 | Schmidt et al. |
| 2009/0192637 A1 | 7/2009 | Picunko et al. |
| 2010/0069148 A1 | 3/2010 | Cargill |
| 2013/0023343 A1* | 1/2013 | Schmidt .............. A63F 13/54 |
| | | 463/35 |
| 2013/0030814 A1 | 1/2013 | Rajput et al. |
| 2013/0185291 A1 | 7/2013 | Tyndall |
| 2014/0018153 A1 | 1/2014 | Nelson et al. |
| 2014/0207811 A1 | 7/2014 | Kim et al. |
| 2014/0258858 A1 | 9/2014 | Hwang |
| 2015/0106718 A1 | 4/2015 | Boulter et al. |
| 2015/0378667 A1 | 12/2015 | Ridihalgh et al. |
| 2016/0092936 A1 | 3/2016 | Bharath et al. |
| 2017/0034596 A1 | 2/2017 | Newell et al. |
| 2017/0154109 A1 | 6/2017 | Lynch et al. |
| 2019/0057688 A1 | 2/2019 | Black |
| 2019/0083886 A1 | 3/2019 | Taylor et al. |

\* cited by examiner

INTELLIGENT USER-BASED GAME SOUNDTRACK

BACKGROUND

Technical Field

This disclosure generally relates to gaming and entertainment applications. More particularly, this disclosure relates to intelligently replacing game background soundtracks with music chosen by the user that preserves the emotional experience intended by the developers of the game.

Background

Traditionally, an audio stream (the audio being music, for instance) is provided to a user playing a video or computer game to enhance the gaming experience of the user. The audio stream (game music stream) often includes game background soundtracks intertwined with in-game sounds generated in response to certain user actions (e.g., in-game conversations or user-triggered game events). The game background soundtracks are predefined by game developers, and as such, the user has little or no control over the selection of in-game music. When the music preferences of the user differ from those of the game developers or if the game background soundtracks become repetitive (and therefore, undesirable to the user), the user may likely turn off the playback of game background soundtracks. The user may then listen to music from their own music library or listen to a radio station online. Thus, there is a demand for enhancing user gaming experience in order to provide users of video and computer games with the ability to replace game background soundtracks with music of their choice.

SUMMARY

This section is provided to introduce a selection of concepts in a simplified form that is further described below in the Detailed Description section. This summary is not intended to identify key features or essential features of the claimed subject matter, nor is it intended to be used as an aid in determining the scope of the claimed subject matter.

In one example embodiment of this disclosure, there is provided a method for playing back audio in a gaming application. An example method comprises receiving a game music stream from the gaming application of a user which includes a game background soundtrack and in-game sounds, extracting audio parameters of the game background soundtrack, determining an emotional classification of the game background soundtrack based on the audio parameters of the game background soundtrack, selecting a user soundtrack from a user music library that matches the emotional classification of the game background soundtrack, replacing at least a part of the game background soundtrack with the user soundtrack, and providing a replacement game music stream to the user, which includes the user soundtrack and the in-game sounds.

In another embodiment of this disclosure, there is provided a system for playing back audio in a gaming application. An example system comprises at least one processor and a memory storing processor-executable codes. The processor is configured to implement the above-outlined method for providing audio playback in a gaming application upon executing the processor-executable codes.

In yet another embodiment of this disclosure, there is provided a non-transitory processor-readable medium having instructions stored thereon, which when executed by one or more processors, cause the one or more processors to implement the above-outlined method for providing audio playback in a gaming application.

Additional novel features of example embodiments are set forth in the detailed description which follows, and can be apparent to those skilled in the art upon examination of the following description and the accompanying drawings or may be learned by production or operation of the examples. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

Figure 1:
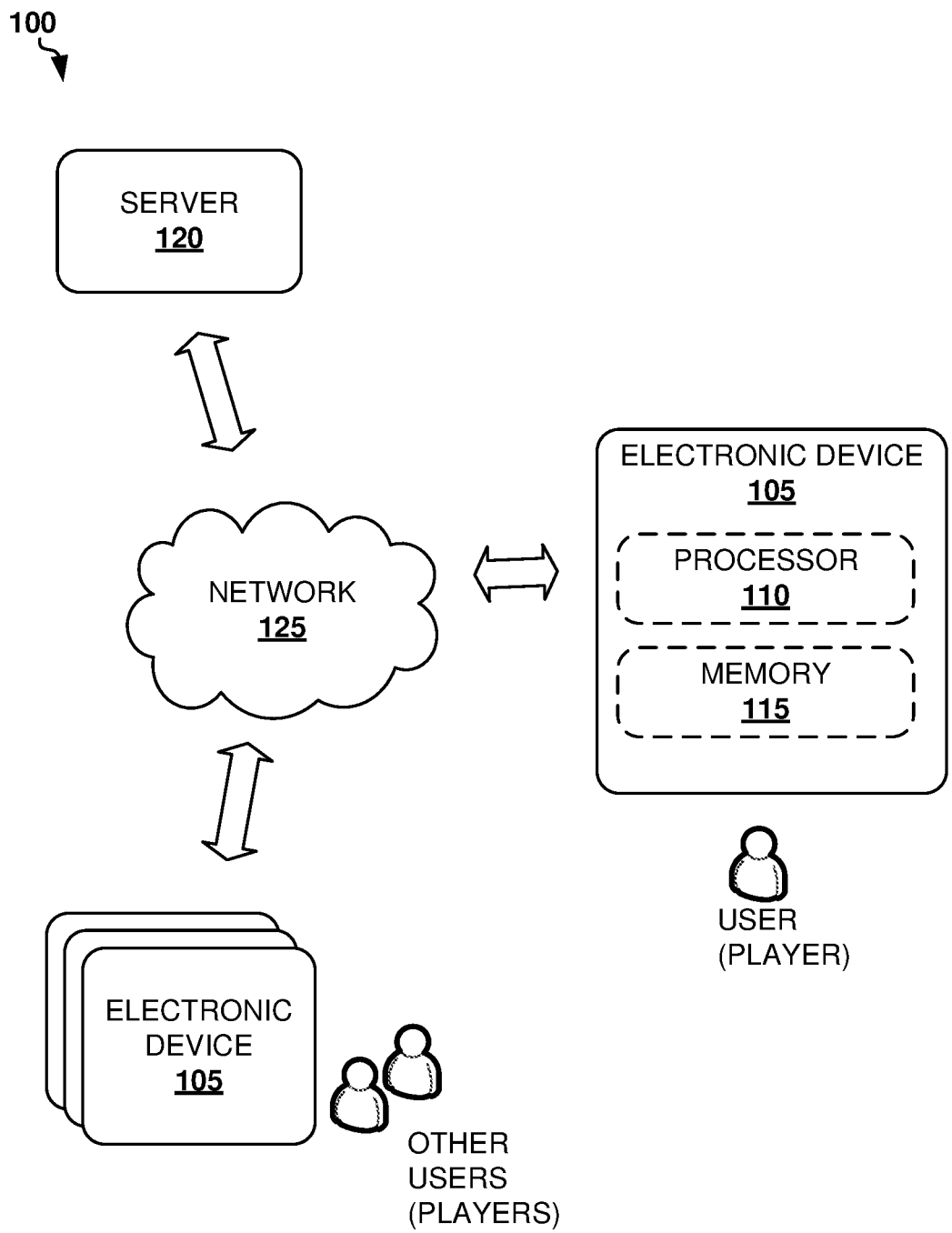
FIG. 1 shows an example system architecture for providing audio playback in a gaming application, according to one embodiment.

Like reference characters indicate similar components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the disclosure. In addition, common but well-understood elements that are useful or common in a commercially feasible embodiment are often not depicted in order to facilitate a less obstructed view of these various embodiments of the disclosure.

DETAILED DESCRIPTION OF EXAMPLE EMBODIMENTS

The disclosure is generally directed to a technology for intelligently replacing at least a portion of game background music with music of a user's choice, while still preserving the in-game sounds of the game. Overall, the technology is directed to enhancing the gaming experience of the user and to addressing other drawbacks known in the art.

The disclosed technology is applicable to computer and video games, including online games, network games, mobile games, multiplayer games, virtual reality games, and the like, which are collectively referred to herein as gaming applications. The technology can be implemented by a computing device, a gaming device, a cell phone, a server, and any other device used to run the gaming application. When a user uses the gaming application, the technology provides an audio stream (game music stream), which includes at least one game background soundtrack intertwined with one or more in-game sounds. The in-game sounds can be provided upon the detection of certain user game actions, such as, for example, shooting of a firearm by a virtual character of a user, engaging in in-game conversations, interacting with other virtual characters, and the like. The game background soundtrack can be repetitive, often not appealing to a user's taste.

The disclosed technology is designed to receive and separate the game background soundtracks from the in-game sounds in a game music stream. Each separated game background soundtrack can be analyzed to extract its audio parameters. The audio parameters can include one or more of the following: a beats-per-minute (BPM) value, a tonality value, a pitch value, a timbre value, a harmonics value, a loudness value, a rhythm value, a sound envelope, a music genre, a release date, and so forth. Furthermore, an emotional classification of the game background soundtrack can be determined based on the analysis of the audio parameters. In some implementations, a machine learning system can be used to classify the game background soundtracks. The machine learning system can be trained using historical user data such as prior music classification. As such, the emotional classification of the game background soundtrack can indicate that the game background soundtrack (or a certain portion of the game background soundtrack) is associated with one or more of predefined emotional states, such as happiness, sadness, joy, wonder, surprise, fear, anxiety, violence, anger, sorrow, disgust, distress, and so forth.

In some additional implementations, the emotional classification can be determined based on gaming data (metadata), gameplay, game content, language associated with gameplay (e.g., conversations of virtual characters), in-game sound triggers, and so forth. In yet other implementations, the emotional classification can be determined based on user emotional state as ascertained, for example, from a facial expression or user conversation. In yet other implementations, the emotional classification can be determined based on a user stress level as ascertained by facial expression, keystroke analysis, user vital parameters, and so forth. Moreover, the emotional classification can be determined based on one or more combinations of the above principles.

Furthermore, the disclosed technology can access and analyze a user music library, which can be stored locally on a user gaming device or remotely on a server. The user music library can include music files or logs (identifiers, indexes) of music files (e.g., logs of music that the user has listened to, or prefers to listen to, using internet radios or online music streaming services). As such, the disclosed technology can analyze user soundtracks of the user music library similar to how the game background soundtracks are analyzed. In other words, each user soundtrack can be analyzed to extract its audio parameters (e.g., a BPM value, a tonality value, a pitch value, a timbre value, a harmonics value, a loudness value, a rhythm value, a sound envelope, a music genre, a release date, and so forth.). Furthermore, an emotional classification of user soundtracks can be determined based on the analysis of the audio parameters. Again, the machine learning system can be used to classify the game background soundtracks. The emotional classifications can be further used to index user soundtracks.

Once the emotional classifications of the game background soundtracks are obtained and the user soundtracks are indexed, the technology allows the matching of emotional classifications. In other words, one or more user soundtracks can be located in the user music library such that they match an emotional classification of certain game background soundtrack (or a portion of the game background soundtrack). For example, when the emotional classification of a certain game background soundtrack is a song having the emotional characteristic of sorrow, the technology allows selecting one or more songs from the user music library, which possess same or similar emotional characteristics.

Furthermore, the technology can allow replacing at least a part of the game background soundtrack with the located user soundtrack. The replacement means that the game user background soundtrack is effectively muted, and the selected user soundtrack is provided instead of the muted game background soundtrack. Additionally, a replacement game music stream can be provided to the user, with the replacement game music stream including the user soundtrack and the in-game sounds intertwined with the user soundtrack.

It should be noted that the process of replacing game background soundtracks with user soundtracks can be performed dynamically and in real-time. Moreover, the replacement can be performed selectively meaning that only certain portions of game background soundtrack are replaced with user soundtracks. For example, the technology can identify predefined sound triggers based on a gameplay of the gaming application, actions of the user in the gaming application, or actions of other users in the gaming application, and replace the game background soundtrack with the user soundtrack at times associated with sound triggers. In other embodiments, game background soundtracks can be replaced with user soundtracks beforehand (i.e., before the user starts using the gaming application).

The replacement of game background soundtracks with user soundtracks can be "seamless" to the user (done seamlessly from the user's point of view). To this end, the disclosed technology can intelligently mix one or more game background soundtracks (which are not replaced or muted) with one or more user soundtracks (which are used to replace certain game background soundtracks) such that a transition between these soundtracks is blended. For example, the transition may involve matching BPM values of the game background soundtrack and user soundtrack, followed by fading out and fading in of the soundtracks.

In yet additional embodiments, when the emotional classification of game background soundtrack and the emotional classification user soundtracks are matched, the technology can intelligently select only certain user soundtracks from a plurality of available user soundtracks to replace one game background soundtrack. The selection can be based on user settings, user preferences, or user music taste as automatically determined by the disclosed technology. Specifically, the technology can access historical user data (e.g., music logs) associated with the user music library and determine user music preferences based on the historical user data.

Furthermore, the technology can prioritize some user soundtracks in the user music library based on the user music preferences. For example, the technology can prioritize recent soundtracks, or recently added soundtracks. In other embodiments, the disclosed technology can determine user music preferences based on the frequency of playing user soundtracks, and prioritize the user soundtracks accordingly. As such, the replacement of a game background soundtrack can be performed with a user soundtrack that has a higher priority than other user soundtracks.

The technology can also enable users to create their user playlists to associate one or more user soundtracks (or their indexes, identifiers) with certain gaming applications. Optionally, the user playlists can identify the manner (or timing) of the replacement of game background soundtracks with user soundtracks from the user playlists. The user playlist can be further stored in a memory of a local user device or a server. Moreover, the users can share their user playlists via the gaming application, a game platform, web service, web site, or otherwise via the Internet. The users can also sell or monetize their user playlists. The users can receive or purchase user playlists of others and use them as described herein to replace the original game background soundtracks. As such, the users do not necessarily need to have their own music library. After acquiring a certain user playlist of another, a user music library can be established and based exclusively on the acquired user playlist.

It should be noted that the users may not always know what user soundtrack is currently playing as the technology allows obtaining the user playlists of others. Thus, users may desire to make inquiries concerning a title or a musician name performing a particular user soundtrack. For these reasons, the disclosed technology allows displaying, at least temporarily and via a graphical user interface of the gaming application, an identifier of the user soundtrack, which can be used to replace the background soundtrack. The identifier can include, for example, a soundtrack title and a name of musician.

The following detailed description of embodiments includes references to the accompanying drawings, which form a part of the detailed description. Approaches described in this section are not prior art to the claims and are not admitted to be prior art by inclusion in this section. Reference throughout this specification to "one embodiment," "an embodiment," "some embodiments," "some implementations" or similar language means that a particular feature, structure, or characteristic described in connection with an example implementation is included in at least one embodiment of the disclosure. Thus, appearances of the phrases "in one embodiment," "in an embodiment," "in some embodiments," and similar language throughout this specification may, but do not necessarily, all refer to the same embodiment.

Furthermore, the described features, structures, or characteristics of embodiments may be combined in any suitable manner in one or more implementations. In the instant description, numerous specific details are provided, such as examples of programming, software modules, user selections, network transactions, hardware modules, hardware circuits, hardware chips, and so forth, to provide a thorough understanding of embodiments. One skilled in the relevant art will recognize, however, that the embodiments can be practiced without one or more of the specific details, or with other methods, components, materials, and so forth. In other instances, well-known structures, materials, or operations are not shown or described in detail to avoid obscuring aspects of the disclosure.

Embodiments of this disclosure will now be presented with reference to accompanying drawings which show blocks, components, circuits, steps, operations, processes, algorithms, and the like, collectively referred to as "elements" for simplicity. These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, Central Processing Units (CPUs), digital signal processors (DSPs), field programmable gate arrays (FPGAs), programmable logic devices (PLDs), state machines, gated logic, discrete hardware circuits, and other suitable hardware configured to perform various functions described throughout this disclosure. One or more processors in the processing system may execute software, firmware, or middleware (collectively referred to as "software"). The term "software" shall be construed broadly to mean processor-executable instructions, instruction sets, code segments, program code, programs, subprograms, software components, applications, software applications, software packages, routines, subroutines, objects, executables, threads of execution, procedures, functions, and the like, whether referred to as software, firmware, middleware, microcode, hardware description language, or otherwise.

Accordingly, in one or more embodiments, the functions described herein may be implemented in hardware, software, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage, solid state memory, or any other data storage devices, combinations of the aforementioned types of computer-readable media, or any other medium that can be used to store computer executable code in the form of instructions or data structures that can be accessed by a computer.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

The terms "gaming application" can be construed to mean a computerized game, a video game, a computer game, a network game, an online game, a multiplayer game, a virtual reality game, a game for mobile device, and the like. The terms "user" and "player" can be used interchangeably and mean a person who plays or uses a gaming application, and also uses or participates in providing audio playback as described herein. The term "soundtrack" should be construed to mean a sound, music, melody, song, sound clip, or any combinations thereof.

Referring now to the drawings, example embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

FIG. 1 shows an example system architecture 100 for providing audio playback in a gaming application, according to one example embodiment. System architecture 100 can include an electronic device 105 such as a game console, gaming device, computing device, mobile device, cellular phone, smart phone, tablet computer, desktop computer, laptop computer, workstation, multimedia device, television device, smart television device, and the like. As such, electronic device 105 may include input and output devices to enable users to play or use gaming applications (i.e., computer games). For example, electronic device 105 may include at least one speaker configured to output (play)

various sounds such as a game music stream and a replacement game music stream generated by the method of providing audio playback as described herein.

Electronic device 105 may also include a processor 110 and a memory 115. Memory 115 can store processor-executable instructions for execution by processor 110. Memory 115 can also store one or more gaming applications, one or more game background soundtracks, one or more in-game sounds, one or more user music libraries, one or more user settings or preferences, one or more user soundtracks, one or more user playlists, and so forth. The processor-executable instructions can cause processor 110 to implement at least some operations of the methods for providing audio playback in a gaming application as disclosed herein. Electronic device 105 may further include a user interface, such as a graphical user interface, enabling the user to interact with a gaming application, activate or deactivate the method for providing audio playback in the gaming application, adjust settings associated with replacement of game background soundtracks with user soundtracks, as well as create, adjust, delete, upload, or download user playlists.

In some embodiments, the gaming application can be an online game, network game, or multiplayer game. Accordingly, electronic device 105 of the user can be operatively connected to one or more servers 120 or electronic devices 105 of other users via a communications network 125. Communications network 125 can refer to any wired, wireless, or optical networks including, for example, the Internet, intranet, local area network (LAN), Personal Area Network (PAN), Wide Area Network (WAN), Virtual Private Network (VPN), cellular phone networks (e.g., packet switching communications network, circuit switching communications network), Bluetooth radio, Ethernet network, an IEEE 802.11-based radio frequency network, IP communications network, or any other data communication network utilizing physical layers, link layer capability, or network layer to carry data packets, or any combinations of the above-listed data networks.

In some implementations, server 120 can implement some or all operations of the method for providing audio playback in a gaming application as described herein. For example, electronic device 105 can allow a user to play a gaming application which generates a game music stream, while server 120 can perform some or all operations for replacing at least a part of game background soundtrack of the game music stream with one or more user soundtracks, and cause electronic device 105 to play a replacement game music stream for the user. In other implementations, all operations of the method for providing audio playback in a gaming application can be implemented by electronic device 105. However, it is not necessary that electronic device 105 is incorporated into a single housing. Rather, in some implementations, electronic device 105 can include several units. For example, processor 110 and memory 115 can be incorporated into a game console, while speakers for presenting the replacement game music stream can be incorporated into a television set, and the game console and the television set can be operatively connected to one another.

Figure 2:
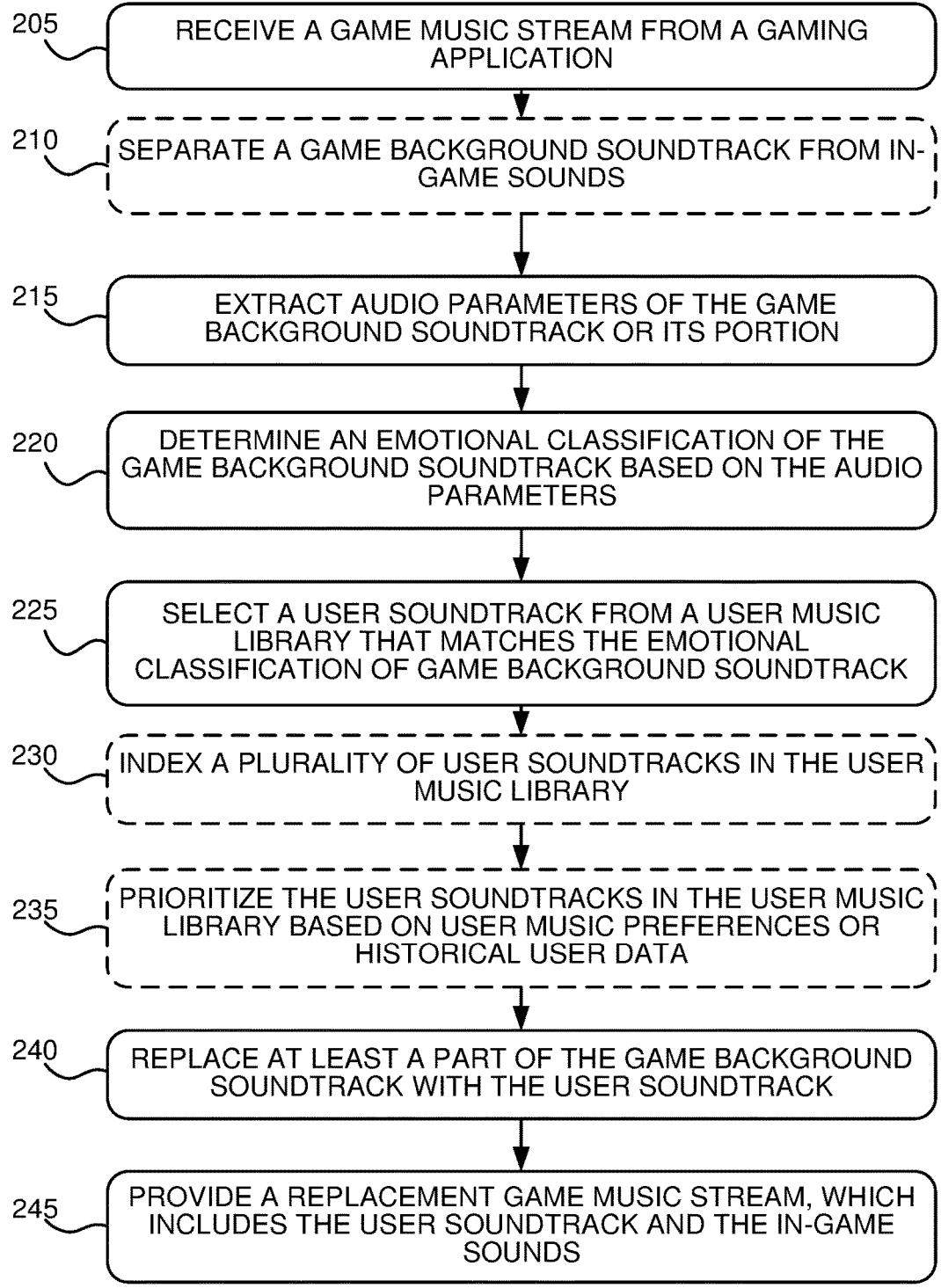
FIG. 2 shows a process flow diagram illustrating a method for providing audio playback in a gaming application, according to an example embodiment.

FIG. 2 is a process flow diagram showing a method 200 for providing audio playback in a gaming application, according to an example embodiment. Method 200 can be performed by processing logic that includes hardware (e.g., decision-making logic, dedicated logic, programmable logic, application-specific integrated circuit (ASIC)), software (such as software run on a general-purpose computer system or a dedicated machine), or a combination of both. In one example embodiment, the processing logic refers to one or more elements of electronic device 105 of FIG. 1. Operations of method 200 recited below can be implemented in an order different than described and shown in the figure. Moreover, method 200 may have additional operations not shown herein, but which can be evident to those skilled in the art from the disclosure. Method 200 may also have fewer operations than shown in FIG. 2 and described below.

At operation 205, electronic device 105 or server 120 can receive a game music stream from a gaming application. The gaming application can be implemented by electronic device 105, server 120, or both to allow a user to play or use the gaming application. For example, the gaming application can include a computerized game, video game, network game, multiplayer game, or an online game. The gaming application can generate the game music stream. The game music stream can include one or more game background soundtracks and in-game sounds. The game background soundtracks can be predefined. The in-game sounds can be dynamically generated based on user actions or actions of other users (e.g., when a virtual character shoots).

At optional operation 210, electronic device 105 or server 120 separates the game background soundtrack and in-game sounds from the game music stream. The separation can be based, for example, on an analysis of audio channels of the gaming application. In another example, audio output of specializer of the gaming application can be monitored to extract the in-game sounds.

At operation 215, electronic device 105 or server 120 extracts audio parameters of the game background soundtrack or a portion of the game background soundtrack. The audio parameters of the game background soundtrack can include three or more of the following: a BPM value, a tonality value, a pitch value, a timbre value, a harmonics value, a loudness value, a rhythm value, a sound envelope, and a music genre.

At operation 220, electronic device 105 or server 120 can determine an emotional classification of the game background soundtrack based on the audio parameters of the game background soundtrack extracted at operation 215. The emotional classification of the game background soundtrack can be indicative of one or more of the following: happiness, sadness, joy, wonder, surprise, fear, anxiety, violence, anger, sorrow, disgust, and distress.

In some embodiments, the determination of the emotional classification of the game background soundtrack is performed by a machine-learning system, which can be trained based on historical user data including user music preferences. Generally, the machine learning system (or neural network) can employ one or more layers, including an input layer, an output layer, and one or more hidden layers. At each layer (except the input layer), an input value is transformed in a non-linear manner to generate a new representation of the input value. The output of each hidden layer can be used as an input to the next layer in the network (i.e., the next hidden layer or the output layer). Each layer of the network generates an output from a received input in accordance with current values of a respective set of parameters. The machine learning system can be trained (learned) based on historical user data to improve accuracy of the determination of the emotional classification. The historical user data can include data characterizing previous successful and failed attempts of emotional classification.

At operation 225, electronic device 105 or server 120 can select a user soundtrack from a user music library that matches the emotional classification of game background soundtrack. The matching can also depend on one or more of the following: a current emotional state of the user, a current stress level of the user, and a current emotional state of the gameplay. The current emotional state of the user can be determined by capturing images of a user facial expression with a video camera and classifying it with a machine learning system. Alternatively, the current emotional state of the user can be determined by recognizing a speech of the user or by analyzing in-game user actions. The current stress level of the user can be identified based on user vital parameters or user motions. For example, keystroke dynamics, user body temperature, user heart pulse, user in-game actions, and other parameters can be analyzed to detect the current stress level of the user. The current emotional state of the gameplay can be determined based on an analysis of a text content of the gaming application. In certain embodiments, an emotional state of a user or gameplay, or a parameter of emotional state of a user (such as a valence) can be determined or calculated by the machine-learning system (algorithm) or the neural network like those described above.

In some embodiments, the user soundtrack can be selected by tracking emotional states of certain users within a multiplayer game environment. For example, an emotional state of a user who won the previous game round can be used to select the user soundtrack to play to all users. Similarly, an emotional state of a user who lost the previous game round can be used to select the user soundtrack to play to all users. Yet in other embodiments, an average emotional state of all users can be used to select the user soundtrack to play to all users. Additionally, the user soundtrack selected to be played to all users can be based on the strongest value of emotional states of all users.

In yet additional embodiments, the user soundtrack selected to be played to all users can be based on determining, obtaining, calculating a valence value associated with emotional states of all users involved in the same gameplay. For example, the user soundtrack can be selected for the strongest (highest) valence of all emotional states of all users involved in the same gameplay. In this example, the machine-learning or the neural network system can calculate the valence by analyzing a probability distribution between one or more sets of emotional states for each user in a group of users. For example, in a scenario illustrated in Table 1 below, the machine-learning or neural network system would select a sad music soundtrack based on the user B emotional state as the strongest valence:

TABLE 1

| | Emotional State, % | | |
|---|---|---|---|
| | User A | User B | User C |
| Happy (positive) emotional state | 40 | 10 | 30 |
| Sad (negative) emotional state | 60 | 90 | 70 |

It should be noted that the matching of the emotional classification of game background soundtrack to emotional classifications of user soundtracks can be performed after classifying and indexing soundtracks of the user music library. As such, method 200 may optionally include operation 230, where electronic device 105 or server 120 indexes a plurality of user soundtracks by accessing the user music library, extracting audio parameters for each of the user soundtracks, determining an emotional classification for each of the user soundtracks based on the audio parameters of the user soundtracks, and determining emotional classifications of each of the user soundtracks based on the audio parameters. The emotional classification of the user soundtracks can be performed by the same machine-learning system as described above and based on the audio parameters of the user soundtracks. Operation 230 can be performed prior to operation 225.

Furthermore, some embodiments of the disclosure include optional operation 235, in which electronic device 105 or server 120 prioritizes the user soundtracks in the user music library based on user music preferences or historical user data. The user music preferences can be determined based on the historical user data (e.g., frequency of playing of certain user soundtracks).

At operation 240, electronic device 105 or server 120 can replace at least a part of the game background soundtrack with the user soundtrack. The replacement of the soundtracks can be performed upon identifying certain sound triggers in a gameplay of the gaming application. Alternatively, the replacement of the soundtracks can be performed upon identifying certain actions of the user in the gaming application or actions of other users in the gaming application.

In addition, the replacement of said at least one part of the game background soundtrack with the user soundtrack can be done seamlessly (from the user's point of view). As such, the game background soundtrack can be mixed with the user soundtrack such that a transition between the game background soundtrack and the user soundtrack is blended by matching one or more of the following in the soundtracks: BPM values, intensity levels, or by applying fading in and fading out procedures.

At operation 245, electronic device 105 or server 120 provides (or causes providing) a replacement game music stream to the user, in which the replacement game music stream includes the user soundtrack and the in-game sounds.

It should be noted that operations 205-245 can be performed before the user initiates the gaming application. Alternatively, operations 205-245 can be performed "on the fly" such that the replacement of the game background soundtrack with the user soundtrack is performed dynamically and selectively during a gameplay.

In additional operations not shown in FIG. 2, electronic device 105 or server 120 can allow creating a user playlist of one or more user soundtracks used to replace one or more parts of the game background soundtrack, and store the user playlist in a memory of electronic device 105 or server 120. Furthermore, the user playlist can be shared by the user with one or more other users via the Internet. The user can also receive a user playlist of another user and use it to perform at least some operation of method 200.

Figure 3:
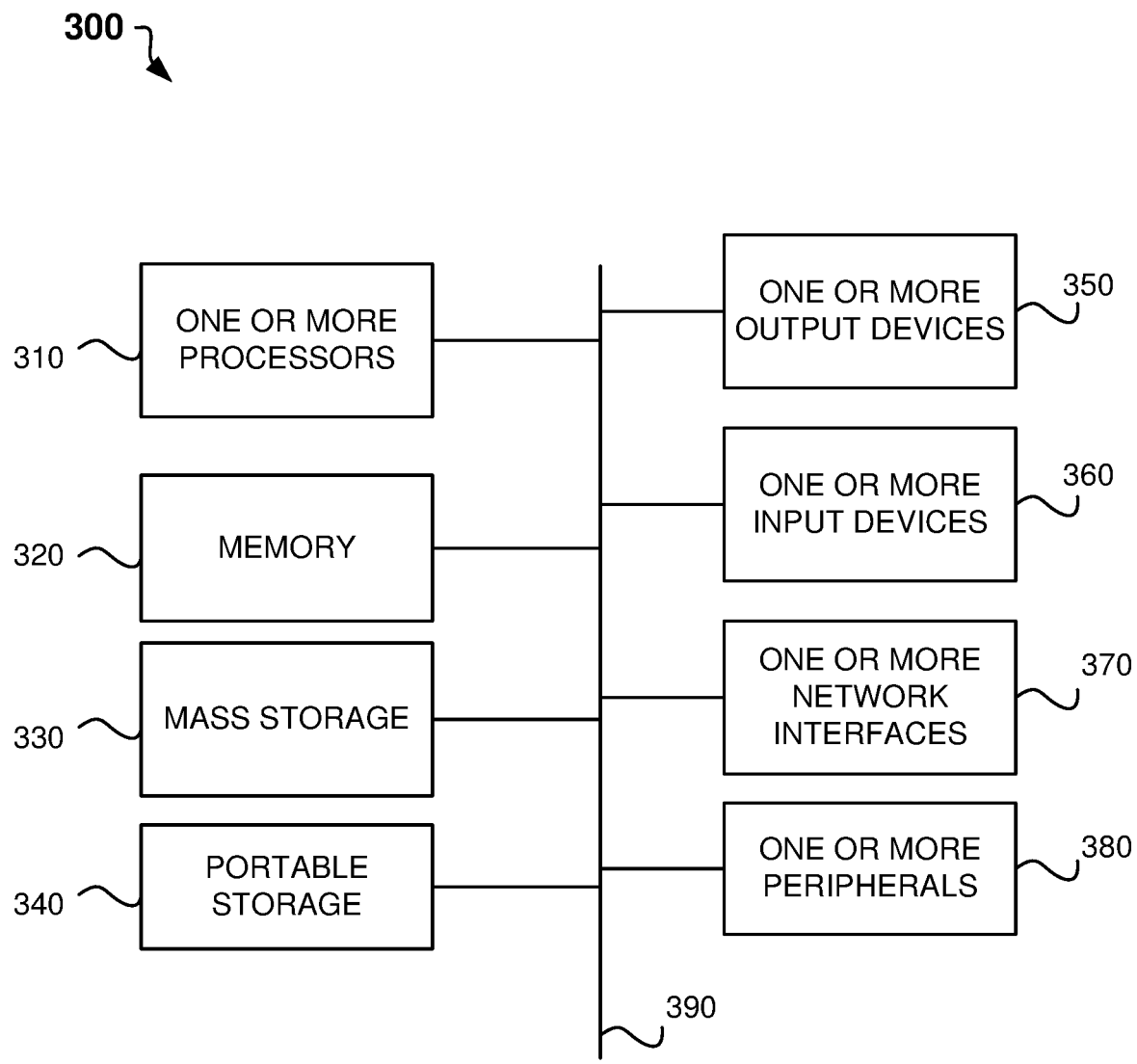
FIG. 3 shows an example computer system that can be used to implement at least some operations of a method for providing audio playback in a gaming application, according to an example embodiment.

FIG. 3 is a high-level block diagram illustrating a computing device 300 suitable for implementing the methods for providing audio playback in a gaming application as described herein. Computing device 300 may include, be, or be an integral part of one or more of a variety of types of devices, such as a game console, among others. In some embodiments, computing device 300 can be regarded as an instance of electronic device 105.

As shown in FIG. 3, computing device 300 includes one or more processors 310, memory 320, one or more mass storage devices 330, one or more portable storage devices 340, one or more output devices 350, one or more input devices 360, one or more network interfaces 370, one or more optional peripheral devices 380, and a communication bus 390 for operatively interconnecting the above-listed elements. Processors 310 can be configured to implement functionality and/or process instructions for execution within computing device 300. For example, processors 310 may process instructions stored in memory 320 or instructions stored on storage devices 330. Such instructions may include components of an operating system or software applications.

Memory 320 is configured to store information within computing device 300 during operation. Memory 320, in some example embodiments, may refer to a non-transitory computer-readable storage medium or a computer-readable storage device. In some examples, memory 320 is a temporary memory, meaning that a primary purpose of memory 320 may not be long-term storage. Memory 320 may also refer to a volatile memory, meaning that memory 320 does not maintain stored contents when memory 320 is not receiving power. Examples of volatile memories include RAM, dynamic random access memories (DRAM), static random access memories (SRAM), and other forms of volatile memories known in the art. In some examples, memory 320 is used to store program instructions for execution by processors 310. Memory 320, in one example, is used by software applications or mobile applications. Generally, software or mobile applications refer to software applications suitable for implementing at least some operations of the methods as described herein.

Mass storage devices 330 can also include one or more transitory or non-transitory computer-readable storage media or computer-readable storage devices. For example, memory 330 can store instructions for processor 310, user music library, game applications, game music, user settings, and so forth. In some embodiments, mass storage devices 330 may be configured to store greater amounts of information than memory 320. Mass storage devices 330 may also be configured for long-term storage of information. In some examples, mass storage devices 330 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Computing device 300 may also include one or more optional input devices 360. Input devices 360 may be configured to receive input from a player through tactile, audio, video, or biometric channels. Examples of input devices 360 may include a keyboard, keypad, mouse, trackball, touchscreen, touchpad, microphone, video camera, image sensor, fingerprint sensor, or any other device capable of detecting an input from the player or other source, and relaying the input to computing device 300 or components thereof.

Optional output devices 350 may be configured to provide output to the player through visual or auditory channels. Output devices 350 may include a video graphics adapter card, display, such as liquid crystal display (LCD) monitor, light emitting diode (LED) monitor, or organic LED monitor, sound card, speaker, headphones, headset, virtual reality headset, projector, or any other device capable of generating output that may be intelligible to a player. Output devices 350 may also include a touchscreen, presence-sensitive display, or other input/output capable displays known in the art.

Computing device 300 can also include network interface 370. Network interface 370 can be utilized to communicate with external devices via one or more communications networks such as communications network 140 or any other wired, wireless, or optical networks. Network interface 370 may be a network interface card, such as an Ethernet card, an optical transceiver, a radio frequency transceiver, or any other type of device that can send and receive information.

An operating system of computing device 300 may control one or more functionalities of computing device 300 or components thereof. For example, the operating system may interact with the software applications or mobile applications and may facilitate one or more interactions between the software/mobile applications and processors 310, memory 320, storage devices 330, input devices 360, output devices 350, and network interface 370. The operating system may interact with or be otherwise coupled to software applications or components thereof. In some embodiments, software or mobile applications may be included in the operating system.

Thus, methods and systems for providing audio playback in a gaming application have been described. Although embodiments have been described with reference to specific example embodiments, it will be evident that various modifications and changes can be made to these example embodiments without departing from the broader spirit and scope of the disclosed application. Accordingly, the specification and drawings are to be regarded in an illustrative rather than a restrictive sense.

What is claimed is:

1. A method for providing audio playback in a gaming application, the method comprising:
   receiving a game music stream from a gaming application of a user, the game music stream including
   a separate game background soundtrack; and
   separate in-game sounds;
   extracting audio parameters of the separate game background soundtrack;
   determining an emotional classification of the separate game background soundtrack based on the audio parameters of the separate game background soundtrack;
   identifying a current emotional state of the user, the identifying comprising:
   capturing images of a user facial expression with a video camera and classifying the user facial expression with a machine learning system;
   recognizing a speech of the user; or
   by analyzing in-game user actions of the user;
   selecting a user soundtrack from a user music library, the user soundtrack being selected:
   based on the current emotional state of the user; and
   to match the emotional classification of the separate game background soundtrack;
   replacing at least a part of the separate game background soundtrack with the user soundtrack; and
   providing a replacement game music stream to the user, the replacement game music stream including both the user soundtrack and the separate in-game sounds.

2. The method of claim 1, wherein the replacement of the at least a part of the separate game background soundtrack with the user soundtrack is performed before the user initiates the gaming application.

3. The method of claim 1, wherein the replacement of the at least a part of the separate game background soundtrack with the user soundtrack is performed dynamically and selectively during a gameplay by the user.

4. The method of claim 1, further comprising:
   accessing the user music library, the user music library including a plurality of user soundtracks;

extracting audio parameters from each of the user soundtracks;

determining an emotional classification for each of the user soundtracks based on the audio parameters of the user soundtracks; and indexing the plurality of user soundtracks based on the emotional classifications, wherein user soundtrack indexes are used to match the emotional classification of the separate game background soundtrack.

5. The method of claim 4, wherein the determination of the emotional classification of each of the user soundtracks and the determination of the emotional classification of the separate game background soundtrack is performed by the machine learning system and wherein the machine learning system is trained based on historical user data including user music preferences.

6. The method of claim 4, wherein the audio parameters of the user soundtracks and the audio parameters of the separate game background soundtrack include three or more of the following: a beats-per-minute (BPM) value, a tonality value, a pitch value, a timbre value, a harmonics value, a loudness value, a rhythm value, a sound envelope, a music genre, and a release date.

7. The method of claim 4, wherein the emotional classifications of the user soundtracks and the emotional classification of the separate game background soundtrack are indicative of one or more of the following: happiness, sadness, neutrality, joy, wonder, surprise, fear, anxiety, violence, anger, sorrow, disgust, and distress.

8. The method of claim 1, further comprising identifying sound triggers based on a gameplay of the gaming application, actions of the user in the gaming application, or actions of other users in the gaming application, wherein the replacement of the at least a part of the separate game background soundtrack with the user soundtrack is performed at times associated with the sound triggers.

9. The method of claim 1, wherein the replacement of the at least a part of the separate game background soundtrack with the user soundtrack includes mixing the separate game background soundtrack and the user soundtrack such that a transition between the separate game background soundtrack and the user soundtrack is blended and seamless to the user.

10. The method of claim 1, further comprising:

accessing historical user data associated with the user music library;

determining user music preferences based on the historical user data; and prioritizing user soundtracks in the user music library based on the user music preferences, wherein the replacement of the at least a part of the separate game background soundtrack is performed with the user soundtrack being a highest priority.

11. The method of claim 1, further comprising:

creating a user playlist of one or more user soundtracks used to replace one or more parts of the separate game background soundtrack; and storing the user playlist in a memory.

12. The method of claim 11, further comprising sharing the user playlist with one or more other users via the Internet.

13. The method of claim 1, further comprising receiving a user playlist of another user, wherein the user music library of the user is based on the user playlist of the other user.

14. The method of claim 1, further comprising separating the separate game background soundtrack and the separate in-game sounds from the game music stream before performing the extraction of the audio parameters of the separate game background soundtrack.

15. The method of claim 1, further comprising temporarily displaying, within the gaming application, an identifier of the user soundtrack used to replace the at least a part of the separate game background soundtrack.

16. The method of claim 1, further comprising identifying a current stress level of the user based on user vital parameters or user motions, wherein the selecting of the user soundtrack from the user music library is further based on the current stress level of the user.

17. The method of claim 1, further comprising further identifying the current emotional state of a gameplay based on a text content of the gaming application.

18. A system for providing audio playback in a gaming application, the system comprising at least one processor and a memory storing processor-executable codes, wherein the at least one processor is configured to implement the following operations upon executing the processor-executable codes:

receiving a game music stream from a gaming application of a user, the game music stream including both a separate game background soundtrack and separate in-game sounds;

extracting audio parameters of the separate game background soundtrack;

accessing a user music library, the user music library including a plurality of user soundtracks;

extracting audio parameters from each of the user soundtracks of the plurality of user soundtracks;

determining, by a machine learning system, an emotional classification for each of the user soundtracks of the plurality of user soundtracks based on the audio parameters of the user soundtracks of the plurality of user soundtracks, the machine learning system being trained based on historical user data including user music preferences;

indexing the plurality of user soundtracks based on the emotional classifications;

determining, by the machine learning system, an emotional classification of the separate game background soundtrack based on the audio parameters of the separate game background soundtrack;

selecting, based on the user soundtrack indexes, a user soundtrack of the plurality of user soundtracks from the user music library that matches the emotional classification of the separate game background soundtrack;

replacing at least a part of the separate game background soundtrack with the user soundtrack of the plurality of user soundtracks; and providing a replacement game music stream to the user, the replacement game music stream including both the user soundtrack of the plurality of user soundtracks and the separate in-game sounds.

19. A non-transitory processor-readable medium having instructions stored thereon, which when executed by one or more processors, cause the one or more processors to implement a method for providing audio playback in a gaming application, the method comprising:

receiving a game music stream from a gaming application of a user, the game music stream including both a separate game background soundtrack and separate in-game sounds;

extracting audio parameters of the separate game background soundtrack;

determining an emotional classification of the separate game background soundtrack based on the audio parameters of the separate game background soundtrack;

identifying a current emotional state of the user, the identifying comprising:
  capturing images of a user facial expression with a video camera and classifying the user facial expression with a machine learning system;
  recognizing a speech of the user; or
  by analyzing in-game user actions of the user;

selecting, based on the current emotional state of the user, a user soundtrack from a user music library that matches the emotional classification of the separate game background soundtrack;

replacing at least a part of the separate game background soundtrack with the user soundtrack; and providing a replacement game music stream to the user, the replacement game music stream including both the user soundtrack and the separate in-game sounds.

20. A method for providing audio playback in a multi-player gaming application, the method comprising:

receiving a game music stream from a gaming application of at least one user, the game music stream including both a separate game background soundtrack and separate in-game sounds;

extracting audio parameters of the separate game background soundtrack;

determining a current emotional state of the at least one user, the determining comprising:
  capturing images of a user facial expression with a video camera and classifying the user facial expression with a machine learning system;
  recognizing a speech of the a least one user; or
  by analyzing in-game user actions of the a least one user;

selecting a user soundtrack from a user music library, the user soundtrack being selected based on the current emotional state of the a least one user and to match the current emotional state of the at least one user;

replacing at least a part of the separate game background soundtrack with the user soundtrack; and providing a replacement game music stream to the at least one user, the replacement game music stream including both the user soundtrack and the separate in-game sounds.

21. The method of claim 20, wherein:
the receiving of the game music stream from the gaming application is performed for a plurality of users;
the determining of the current emotional state is performed for each of the plurality of users;
the user soundtrack is selected to match an average emotional state of all users; and
the providing of the replacement game music stream is performed to the plurality of users.

22. The method of claim 20, wherein:
the receiving of the game music stream from the gaming application is performed for a plurality of users;
the determining of the current emotional state is performed for a winning user, selected from the plurality of users who won a previous game round;
the user soundtrack is selected to match the current emotional state of the winning user; and
the providing of the replacement game music stream is performed to the plurality of users.

23. The method of claim 20, wherein:
the receiving of the game music stream from the gaming application is performed for a plurality of users;
the determining of the current emotional state is performed for a losing user, selected from the plurality of users who lost a previous game round;
the user soundtrack is selected to match the current emotional state of the losing user; and
the providing of the replacement game music stream is performed to the plurality of users.

* * * * *